United States Patent
Okido et al.

(10) Patent No.: US 6,838,513 B2
(45) Date of Patent: Jan. 4, 2005

(54) INK FOR GOLF BALL

(75) Inventors: Yoshiyuki Okido, Kobe (JP); Satoru Komatsu, Kobe (JP); Hiroaki Tanaka, Kobe (JP); Kazuhisa Fushihara, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 278 days.

(21) Appl. No.: 10/152,680

(22) Filed: May 23, 2002

(65) Prior Publication Data

US 2003/0027663 A1 Feb. 6, 2003

(30) Foreign Application Priority Data

Jun. 28, 2001 (JP) ........................................ 2001-196737

(51) Int. Cl.⁷ .............................................. A63B 37/14
(52) U.S. Cl. ....................... 524/590; 524/602; 525/440; 106/31.37; 106/31.47; 106/31.69; 106/31.77; 473/371; 473/378
(58) Field of Search .......................... 106/31.37, 31.47, 106/31.69, 31.77; 524/590, 602; 525/440; 473/371, 378

(56) References Cited

U.S. PATENT DOCUMENTS

| | | | |
|---|---|---|---|
| 5,160,536 A | | 11/1992 | Harris et al. |
| 5,260,358 A | * | 11/1993 | Shimizu et al. ............... 524/31 |
| 5,391,685 A | * | 2/1995 | Hitomi et al. ................ 528/75 |
| 5,770,325 A | | 6/1998 | Keller et al. |
| 6,018,012 A | * | 1/2000 | Crast et al. ................... 528/73 |

FOREIGN PATENT DOCUMENTS

| | | | |
|---|---|---|---|
| JP | 06347728 | * | 12/1994 |
| JP | 07304836 | * | 11/1995 |
| JP | 2000-303012 A | | 10/2000 |

OTHER PUBLICATIONS

Ashford's Dictionary of Industrial Chemicals 1995; p. 381.*

* cited by examiner

Primary Examiner—David J. Buttner
(74) Attorney, Agent, or Firm—Birch, Stewart, Kolasch & Birch, LLP

(57) ABSTRACT

A golf ball 1 has a core 2, a cover 3, a mark layer 4, and a finishing coat layer 5. An ink used for the mark layer 4 includes an isocyanate curing agent that contains a diisocyanate trimer, a base material, and a colorant. Preferred curing agent contains an isophorone diisocyanate trimer. The ink includes a diisocyanate curing agent at equal to or greater than 1% by weight and equal to or less than 20% by weight, calculated on the basis of the solid content. The base material includes a polymer having a hydroxyl group as a principal component. The "NCO/OH" value, which is a ratio of isocyanate groups of the isocyanate curing agent and hydroxyl groups of the base material, is equal to or greater than 0.5 and equal to or less than 2.0. The mark layer 4 may be printed on a base coat layer, alternatively, may be printed on a crosslinked rubber. This ink has excellent adhesiveness to a base.

6 Claims, 1 Drawing Sheet

INK FOR GOLF BALL

BACKGROUND OF THE INVENTION

1. Field of the Invention

The present invention relates to an ink that is suitable for a mark layer of a golf ball.

2. Description of the Related Art

Golf balls used for playing golf at a golf course are formed with a mark layer for the purpose of denoting a trademark, a numbers for distinguishing the players, the manufacturer and the like. On the other hand, golf balls for use in a golf practice range that is called "driving range" are formed with a mark layer denoting the name of the practice range, and with a linear mark layer for an antitheft purpose. These mark layers are formed from ink.

The mark layer may be directly printed on a body of the ball, alternatively, may be printed on a base coat layer, which is usually a white paint, formed on the surface of a body of the ball. When the mark layer is directly printed on a body of the ball, a crosslinked rubber or an ionomer resin may often be a base for the mark layer. In general, a finishing coat layer, which consists of a clear paint, is formed on the mark layer for the purpose of the protection of the mark layer. This finishing coat layer plays a role in the improvement of the appearance, the prevention of the pollution, and the like.

A golf ball is repeatedly hit with a golf club, and repeatedly impacts on the ground surface. Through the hitting and the impact, the finishing coat layer is gradually worn out or exfoliated. Concomitant with this event, the mark layer also gradually disappears. Upon disappearance of the mark layer, the appearance of the ball is deteriorated, and in addition, the function of the denotation of the mark layer itself is also impaired. A mark layer that insufficiently adheres to its base is liable to disappear. Therefore, inks having excellent adhesiveness to bases are of a great concern to the golf ball manufacturers.

Aiming at the improvement of the adhesiveness, a variety of investigations have been conducted for the modification of inks in both respects of the base materials and the curing agents. Japanese Patent No. 3102817 (U.S. Pat. No. 5,160,536) discloses a golf ball having a mark layer formed from an ink, which comprises nitrocellulose as a base material. Japanese Patent Publication Reference JP-A 122271/1997 (U.S. Pat. No. 5,770,325) discloses a golf ball having a mark layer formed from an ink that contains an ultraviolet curable resin and a photopolymerization initiator. Japanese Patent Publication Reference JP-A 303012/2000 discloses a golf ball having a mark layer formed from an ink that contains acrylpolyol and isocyanate. Japanese Patent Publication Reference JP-A 40260/2001 discloses a golf ball having a mark layer formed from an ink that contains a vinyl resin as a base material, and isocyanate.

However, it is still in a status that a mark layer having sufficient adhesiveness to the base has not been achieved yet. In particular, insufficient adhesion tends to result when no base coat layer is provided, and thus a mark layer is directly printed on the body of the ball. Accordingly, there exist urgent needs for the improvement of inks.

SUMMARY OF THE INVENTION

An ink for a golf ball according to the present invention comprises an isocyanate curing agent that contains a diisocyanate trimer, a base material and a colorant. A mark layer formed from the ink that contains a diisocyanate trimer has excellent adhesiveness to the base. Although detailed mechanisms by which the adhesiveness is improved are unknown, it is speculated that the diisocyanate trimer may promote three dimensional crosslinkage of the base material.

Preferably, the percentage content of the isocyanate curing agent in the ink is equal to or greater than 1% by weight and equal to or less than 20% by weight, which is calculated on the basis of the solid content. The ink that contains an isophorone diisocyanate trimer has especially superior adhesiveness. Improvement of the adhesiveness of a diisocyanate trimer is particularly eminent in the ink of which base material is a polymer having a hydroxyl group. Preferably, ratio of isocyanate groups of the isocyanate curing agent and hydroxyl groups of the base material is equal to or greater than 0.5 and equal to or less than 2.0.

The ink exhibits superior adhesiveness also in cases where the golf ball does not have a base coat layer, and thus a mark layer is directly printed on a body of the ball, in other words, where the base is a crosslinked rubber containing polybutadiene as a principal component, or is a resin composition containing an ionomer resin as a principal component.

DESCRIPTION OF THE PREFERRED EMBODIMENTS

Figure 1:
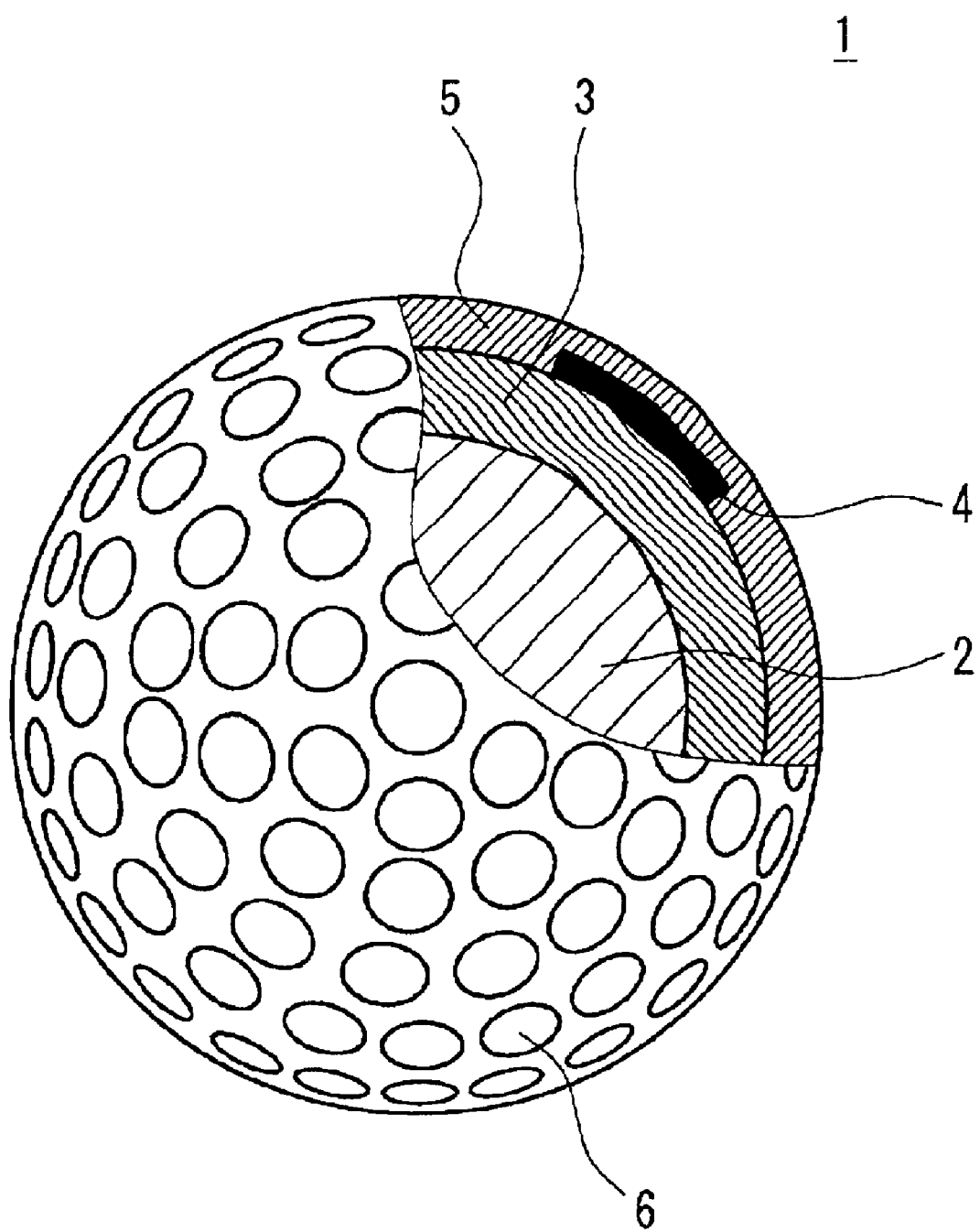
FIG. 1 is a schematic view illustrating a golf ball according to one embodiment of the present invention with a partially cut off cross-section.

The present invention is hereinafter described in detail with appropriate references to the accompanying drawing according to the preferred embodiments of the present invention.

A golf ball depicted in FIG. 1 has a core 2, a cover 3, a mark layer 4, and a finishing coat layer 5. The core 2 has a spherical shape, which is formed by crosslinking a rubber composition. The cover 3 consists of a resin composition containing an ionomer resin as a principal component. The mark layer 4 is printed on the cover 3. The finishing coat layer 5 is formed by overpainting a clear paint onto the mark layer 4. Numerous dimples 6 are provided on the surface of this golf ball 1.

The ink is used for printing the mark layer 4. This ink comprises an isocyanate curing agent that contains a diisocyanate trimer, a base material and a colorant. After the printing is completed, the ink causes a crosslinking reaction to form the mark layer 4.

This isocyanate curing agent is obtained by a nurate reaction of diisocyanate monomers. Diisocyanate trimer is produced by the nurate reaction. This trimer is also referred to as "isocyanurate". When the diisocyanate trimer participates in the crosslinking reaction, a part of isocyanate groups contained in the diisocyanate trimer is speculated to bind also to the base. Owing to the diisocyanate trimer, the adhesiveness between the mark layer 4 and the cover 3 is improved. The curing agent obtained by the nurate reaction also contains reaction products other than the trimer, and unreacted diisocyanate monomers. These reaction products other than the trimer, and diisocyanate monomers also participate in the crosslinking reaction of the ink.

The percentage of diisocyanate trimer in the total amount of the isocyanate curing agent is preferably 5% by weight or greater, more preferably 10% by weight or greater, and particularly preferably 20% by weight or greater.

Accordingly, adhesiveness between the mark layer 4 and the base is improved.

Diisocyanate, which becomes a starting material of the isocyanate curing agent, may be any one of aliphatic diisocyanate, alicyclic diisocyanate, aromatic diisocyanate and aromatic and aliphatic diisocyanate. Specific examples of the starting material include isophorone diisocyanate, hexamethylene diisocyanate, xylylene diisocyanate, hydrogenated xylylene diisocyanate, tetramethylxylylene diisocyanate, hydrogenated diphenylmethane diisocyanate, and tolylene diisocyanate. Two or more diisocyanate may be used in combination.

Particularly suitable starting material is isophorone diisocyanate. A trimer produced from isophorone diisocyanate may especially participate in the three dimensional crosslinkage of the ink. A structural formula of the trimer produced from isophorone diisocyanate is illustrated in the chemical formula below.

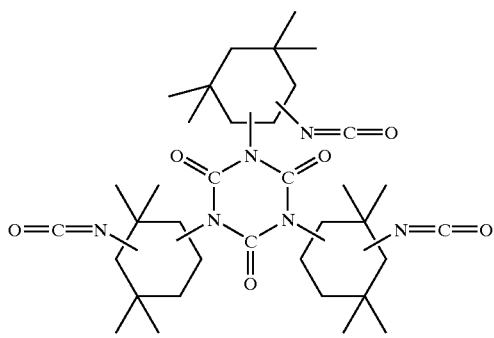

The percentage content of the isocyanate curing agent in the ink is preferably equal to or greater than 1% by weight and equal to or less than 20% by weight, which is calculated on the basis of the solid content. When the percentage content is below the above range, crosslinking density of the mark layer 4 becomes deficient, and thus insufficient adhesiveness to the base may be achieved. In this respect, the percentage content is preferably equal to or greater than 2% by weight, and more preferably equal to or greater than 5% by weight. When the percentage content is beyond the above range, flexibility of the mark layer 4 may be impaired. In this respect, the percentage content is preferably equal to or less than 15% by weight, and more preferably equal to or less than 12% by weight.

The content of the isocyanate curing agent in the ink is preferably equal to or greater than 5 parts by weight and equal to or less than 80 parts by weight on the basis of 100 parts by weight of the base material. When the content is below the above range, crosslinking density of the mark layer 4 becomes deficient, and thus insufficient adhesiveness to the base may be achieved. In this respect, the content is preferably equal to or greater than 10 parts by weight, and more preferably equal to or greater than 15 parts by weight. When the content is beyond the above range, flexibility of the mark layer 4 may be impaired. In this respect, the content is preferably equal to or less than 75 parts by weight, and more preferably equal to or less than 70 parts by weight.

Although the base material of the ink is not limited, a polymer having a hydroxyl group is suitable. Illustrative examples of such a polymer include polyester polyol, polyether polyol, polyurethane polyol and nitrocellulose. Two or more kinds of the polymers may be used in combination. When a polymer having a hydroxyl group is used as a base material, strength of the mark layer 4 is improved because this hydroxyl group binds to the isocyanate group in the curing agent.

Also in the case where a polymer without any hydroxyl group is used as a base material, the isocyanate curing agent that contains a diisocyanate trimer effectively serves. Illustrative examples of such a polymer include epoxy resins. Polymers with and without a hydroxyl group may be used in combination.

When a polymer having a hydroxyl group is used as a base material, "NCO/OH" value, which is a ratio of isocyanate groups of the isocyanate curing agent and hydroxyl groups of the base material, is preferably equal to or greater than 0.5 and equal to or less than 2.0. When the ratio is below the above range, curing of the ink may require a long time period, and thus the productivity of the golf ball 1 may be reduced. In this respect, the ratio is more preferably equal to or greater than 0.9. In addition, when the ratio is below the above range, isocyanate groups may be consumed in only the reaction with the base material, and thus insufficient reaction with the base layer may be achieved. In this respect, the ratio is particularly preferably equal to or greater than 1.15. When the ratio is beyond the above range, pot life of the ink may be shortened. In this respect, the ratio is particularly preferably equal to or less than 1.7.

The percentage of the summation amount of the base material and the curing agent in the total amount of the ink is equal to or greater than 30% by weight and equal to or less than 90% by weight, which is calculated on the basis of the solid content. When the percentage is below the above range, strength of the mark layer 4 may be deficient. In this respect, the percentage is more preferably equal to or greater than 40% by weight, and particularly preferably equal to or greater than 50% by weight. When the percentage is beyond the above range, content of the colorant becomes inevitably low, and thus concealing ability of the mark layer 4 may be insufficient. In this respect, the percentage is more preferably equal to or less than 85% by weight, and particularly preferably equal to or less than 80% by weight.

Kinds of the colorant are not limited, and those capable of coloring the mark layer 4 to yield the desired color may be selected among known pigments and dyes. Illustrative examples of black pigments that can be used include carbon black such as acetylene black, lamp black, aniline black and the like. Illustrative examples of yellow pigments that can be used include chrome yellow, zinc yellow, cadmium yellow, iron oxide yellow, mineral fast yellow, nickel titanium yellow, navel's yellow, naphthol yellow S, Hansa yellow G, Hansa yellow 10G, benzidine yellow G, benzidine yellow GR, quinoline yellow lake, permanent yellow NCG and tartrazine lake. Illustrative examples of orange pigments that can be used include chrome orange, molybdenum orange, permanent orange GTR, pyrazolone orange, vulcan orange, indanthrene brilliant orange RK, benzidine orange G and indanthrene brilliant orange GK. Illustrative examples of red pigments that can be used include colcothar, cadmium red, lead oxide red, cadmium mercury sulfide, permanent red 4R, lithol red, pyrazolone red, watching red calcium salt, lake red D, brilliant carmine 6B, eosine lake, rhodamine lake B, alizarin lake and brilliant carmine 3B. Illustrative examples of purple pigments that can be used include manganese purple, fast violet B and methyl violet lake. Illustrative examples of blue pigments that can be used include iron blue, cobalt blue, alkali blue lake, Victoria blue lake, copper phthalocyanine blue, metal-free phthalocyanine blue, copper phthalocyanine blue partial chloride, fast sky blue and indanthrene blue BC. Illustrative examples of green pigments that can be used include chromium green, chromium oxide, pigment green B, malachite green lake and fanal yellow green G. Illustrative examples of white pigments that can be used include zinc white, titanium oxide, antimony white and zinc sulfide. Illustrative examples of white pigments that can be used include baryta powder, barium carbonate, clay, white carbon, talc and alumina white. Two or more kinds of the colorants may be used in combination. The percentage content of the colorant in the ink may be equal to or greater than 2% by weight and equal to or less than 40% by weight, particularly equal to or greater than 5% by weight and equal to or less than 30% by weight, which is calculated on the basis of the solid content.

Solvent is blended to the ink as needed. The kinds of the solvent are not limited, and propylene glycol monomethyl ether acetate, butanol, Cellosolve, 3-methoxy-3-methylbutyl acetate, n-butyl acetate, cyclohexane, methylethyl ketone, benzene, toluene, xylene and the like can be used. Through blending the solvent, the viscosity of the ink can be adjusted. The percentage of the solvent in the ink may be equal to or greater than 2% by weight and equal to or less than 50% by weight, particularly equal to or greater than 5% by weight and equal to or less than 30% by weight.

Antioxidants, ultraviolet light absorbers, delusterants and other additives may be blended at an appropriate amount to the ink as needed. Suitable antioxidants include phenolic antioxidants, sulfuric antioxidants and phosphoric antioxidants. Suitable ultraviolet light absorbers include benzophenone ultraviolet light absorbers, benzotriazole ultraviolet light absorbers, acrylate ultraviolet light absorbers and salicylate ultraviolet light absorbers. Chelating agents such as acetyl acetone may be blended in the ink at an appropriate amount for the purpose of making the pot life prolonged.

The ink of the present invention is also suitable for so-called one-piece balls of which body consists of a single solid rubber. When the mark layer 4 is formed on a one-piece ball, the base of this mark layer 4 is a crosslinked rubber. Common one-piece ball is formed with a rubber composition being crosslinked, which contains polybutadiene as a principal component. Because the diisocyanate trimer contained in the ink also reacts with polybutadiene, adhesiveness between the base and the mark layer 4 is improved.

There may be a case where a base coat layer is provided on a body of a ball, and the mark layer 4 is printed on this base coat layer. Also in this case, the reaction between diisocyanate trimer and a base coat layer results in the improvement of the adhesiveness of the mark layer 4. Although a base coat layer is usually formed from a white paint, the mark layer 4 may be printed on a base coat layer consisting of a clear paint.

Process for printing a mark layer 4 is not particularly limited, however, a pad printing process is usually employed. In a pad printing process, a chief material (including a base material and colorant therein), an isocyanate curing agent and solvent are mixed first to produce the ink. Next, images are formed on a proof by this ink. Through pressing a pad onto this proof, the images are transferred to the pad. Then, through pressing this pad to-a body of a ball, the images are transferred to the body (or a base coat layer) of the ball. Following the transfer, the ink gets dry and rigid to complete the formation of a mark layer 4. Although dimples 6 are provided on the golf ball 1, printing into the dimples is also enabled due to the pad being flexible and excellent in deformability.

EXAMPLES

Example 1

A chief material of which base material includes polyester polyol and nitrocellulose ("PAD-1 ink", trade name by Navitas Co. Ltd.) 100 parts by weight, an isocyanate curing agent that contains an isophorone diisocyanate trimer ("VESTANAT T 1890", trade name by Huls AG) 10 parts by weight, toluene 5 parts by weight, and methylethyl ketone 2 parts by weight were mixed to give an ink. On the other hand, a body of a ball was prepared, which was manufactured by crosslinking a rubber composition that contains cis-1,4-polybutadiene as a principal component. A mark layer having a predetermined figure was formed to the body by means of a pad printing process. A transparent urethane paint was then coated to form a finishing coat layer having a thickness of about 10 μm. Accordingly, the golf ball of Example 1 was obtained.

Comparative Example 1

In a similar manner to Example 1 except that an isophorone diisocyanate curing agent ("Desmodur I", trade name by Sumitomo Bayer Urethane KK) was used instead of the isocyanate curing agent that contains an isophorone diisocyanate trimer, the golf ball of Comparative Example 1 was obtained.

Comparative Example 2

In a similar manner to Example 1 except that a hexamethylene diisocyanate curing agent ("JA960", trade name by Navitas Co. Ltd.) was used instead of the isocyanate curing agent that contains an isophorone diisocyanate trimer, the golf ball of Comparative Example 2 was obtained.

Example 2

A chief material of which base material includes an epoxy resin ("EPH", trade name by Navitas Co. Ltd.) 100 parts by weight, an isocyanate curing agent that contains an isophorone diisocyanate trimer ("VESTANAT T 1890" as described above) 10 parts by weight, toluene 5 parts by weight, and methylethyl ketone 2 parts by weight were mixed to give an ink. On the other hand, a body of a ball was prepared, which was manufactured with a core made of a crosslinked rubber and with a cover made of an ionomer resin composition. A mark layer having a predetermined figure was formed to the body by means of a pad printing process. A transparent urethane paint was then coated to form a finishing coat layer having a thickness of about 10 μm. Accordingly, the golf ball of Example 2 was obtained.

Comparative Example 3

In a similar manner to Example 2 except that an isophorone diisocyanate curing agent ("Desmodur I" as described above) was used instead of the isocyanate curing agent that contains an isophorone diisocyanate trimer, the golf ball of Comparative Example 3 was obtained.

Comparative Example 4

In a similar manner to Example 2 except that a hexamethylene diisocyanate curing agent ("JA960" as described above) was used instead of the isocyanate curing agent that contains an isophorone diisocyanate trimer, the golf ball of Comparative Example 4 was obtained.

[Evaluation of Adhesiveness]

A 4-fold diluted solution of a strong alkali detergent ("Yogoretol", trade name by Yokohama Jushi KK) was prepared, and the golf ball was immersed therein for 30 minutes. This golf ball was retrieved from the diluted solution, and subjected to the brushing for 30 minutes under running water. The status of disappearance of the mark layer was then visually evaluated. The golf ball having a disappeared area of less than one quarter of the marked area was evaluated as "A"; that having a disappeared area of equal to or greater than one quarter and less than one half of the marked area was evaluated as "B"; that having a disappeared area of equal to or greater than one half and less than three quarter parts of the marked area was evaluated as "C"; and that having a disappeared area of equal to or greater than three quarter parts of the marked area was evaluated as "D". The results of the evaluation are represented in Table 1 below.

TABLE 1

| | Example 1 | Comparative Example 1 | Comparative Example 2 | Example 2 | Comparative Example 3 | Comparative Example 4 |
|---|---|---|---|---|---|---|
| | | | Evaluation results | | | |
| Base Layer | Crosslinked polybutadiene | Crosslinked polybutadiene | Crosslinked polybutadiene | Ionomer resin composition | Ionomer resin composition | Ionomer resin composition |
| Base material | Polyester polyol Nitrocellulose | Polyester polyol Nitrocellulose | Polyester polyol Nitrocellulose | Epoxy resin | Epoxy resin | Epoxy resin |
| Curing agent | Containing isophorone diisocyanate trimer | Isophorone diisocyanate | Hexamethylene diisocyanate | Containing isophorone diisocyanate trimer | Isophorone diisocyanate | Hexamethylene diisocyanate |
| Evaluation | A | C | C | B | D | D |

As shown in Table 1, more area of the mark layer remains on the golf balls of Examples 1 and 2 in which an isocyanate curing agent that contains a diisocyanate trimer was used, in comparison with those of respective Comparative Examples. According to these evaluation results, advantages of the present invention are manifest.

The description herein above is merely for illustrative examples, and therefore, various modifications can be made without departing from the principles of the present invention.

What is claimed is:

1. A golf ball having a mark layer, said mark layer is formed from an ink which comprises an isocyanate curing agent that contains a diisocyanate trimer, a base material and a colorant.

2. The golf ball according to claim 1 wherein the base of the mark layer is a crosslinked rubber containing polybutadiene as a principal component, or a resin composition containing an ionomer resin as a principal component.

3. The golf ball according to claim 1 wherein the ink has a percentage content of the isocyanate curing agent that is equal to or greater than 1% by weight and equal to or less than 20% by weight, which is calculated on the basis of the solid content.

4. The golf ball according to claim 1 wherein the diisocyanate trimer in the ink is an isophorone diisocyanate trimer.

5. The golf ball according to claim 1 wherein the base material in the ink comprises a polymer having a hydroxyl group as a principal component.

6. The ink for a golf ball according to claim 5 wherein "NCO/OH" value, which is a ratio of isocyanate groups of the isocyanate curing agent and hydroxyl groups of the base material, is equal to or greater than 0.5 and equal to or less than 2.0.

* * * * *